United States Patent [19]

Leroux

[11] 4,370,070

[45] Jan. 25, 1983

[54] DIGITAL THERMOMETER HAVING FAHRENHEIT AND CELSIUS READOUT MODES

[75] Inventor: Marcel H. Leroux, Trumbull, Conn.

[73] Assignee: General Electric Company, New York, N.Y.

[21] Appl. No.: 234,372

[22] Filed: Feb. 13, 1981

[51] Int. Cl.³ .............................................. G01K 7/22
[52] U.S. Cl. .............................. 374/170; 235/92 MT; 235/92 PL; 364/557
[58] Field of Search ................. 73/362 AR; 364/557; 235/92 PL, 92 TS, 92 MT, 92 DM

[56] References Cited

U.S. PATENT DOCUMENTS

3,858,033 12/1974 Esch ............................... 235/92 PL
4,117,722 10/1978 Helmstetter ........................ 364/835

*Primary Examiner*—Steven L. Stephan
*Attorney, Agent, or Firm*—George R. Powers; Leonard J. Platt; John F. Cullen

[57] ABSTRACT

An electronic digital thermometer is provided with temperature-responsive means for producing pulses at a frequency related in a known manner to a sensed temperature. A control means permits the transmission to a counting means for a fixed period of time only of a selected one only of at least two predetermined portions of the pulses. The portions of the pulses transmitted are selected to be proportional to the magnitudes of the sensed temperature as expressed in respective temperature scales, preferably the Celsius and Fahrenheit scales. Decoding and display means are coupled to the counting means for converting the number of pulses counted by the counting means during the fixed period of time into a digital display of the sensed temperature in the selected scale.

5 Claims, 12 Drawing Figures

TEMP CLOCK
TEMP CLOCK
READ TIME (R.T.)
R.T. SYNC 1
R.T. SYNC 2
OUTPUT

DIGITAL THERMOMETER HAVING FAHRENHEIT AND CELSIUS READOUT MODES

BACKGROUND OF THE INVENTION

1. Field of the Invention

This invention relates to electronic digital thermometers and, more particularly, to an electronic digital thermometer capable of sensing and numerically displaying temperature in either degrees Fahrenheit or degrees Celsius.

2. Description of the Prior Art

U.S. Pat. No. 4,117,722, issued to P. M. Helmstetter on Oct. 3, 1978, describes apparatus wherein a thermistor is used to sense temperature. In the apparatus, the thermistor is also associated with circuitry to provide a temperature related current to a capacitor to charge the capacitor to a predetermined threshold level, after which the capacitor voltage is rapidly reduced to a predetermined lower level. The rise time of the voltage across the capacitor is dependent on the magnitude of the temperature related current and, therefore, the charging and discharging repeats itself with a frequency related to the temperature at the site of the thermistor. The threshold circuitry includes a flip-flop which provides a signal at such frequency and the signal is coupled to a counter by a gate which is open for a first period of time if a measure of temperature in degrees Celsius is desired or for a second period of time if a measure of temperature in degrees Fahrenheit is desired. The first and second predetermined periods are related to the nine-fifths ratio which relates Fahrenheit and Celsius degrees. The counter includes a selectable preset count which is used to compensate for the 32° offset between the Fahrenheit and Celsius temperature scales.

The known prior art also includes the digital thermometer disclosed in copending patent application Ser. No. 093,841, filed on Nov. 13, 1979, in the name of Clinton L. Pinkham and assigned to the assignee of this application. The copending application describes a Fahrenheit/Celsius digital thermometer in which the capacitor charging current has a value proportional to the difference between a temperature related current and a second predetermined current. The predetermined current may be selected so that the frequency at which the capacitor is charged and discharged accurately represents the temperature sensed in either the Celsius or Fahrenheit scale systems. Another feature of the apparatus of the copending application resides in that Celsius or Fahrenheit indications can be provided by changing, in the apparatus, the value of the capacitance provided by the capacitor and/or the magnitude of the voltage range allowed across the capacitor.

SUMMARY OF THE INVENTION

It is a primary object of the invention to provide an improved electronic thermometer which is capable of providing a digital indication of a sensed temperature in a selected one of at least two measurement scales, preferably the Fahrenheit and Celsius scales.

Another object of this invention is to provide an improved electronic digital thermometer that produces a temperature signal having a frequency that is related in a known manner to the sensed temperature and thereafter converts the fixed frequency signal for a given sensed temperature into a digital display of the temperature in a selected one of at least two scale systems.

Another object is to provide accurate calibration of a digital thermometer without excessive material or labor costs; more particularly, it is an object to provide a calibration method that may be quickly, easily, and inexpensively accomplished on a high volume production basis.

Yet another object is to provide the foregoing objects in an electronic thermometer in which the gate to the counter is open for a fixed period of time that is the same for all sensed temperatures and for both of the Fahrenheit and Celsius modes of operation.

A still further object of the invention is to provide the foregoing objects in an electronic digital thermometer having means for calibrating the fixed period of time during which the gate to the counter is open.

Briefly stated, in carrying out the invention in one form, an electronic digital thermometer is provided with temperature responsive means for producing pulses at a frequency related in a known manner to the sensed temperature. The temperature responsive means is coupled to a primary counting means by a control means which permits the transmission of pulses produced by the temperature responsive means to the primary counting means for a fixed period of time only. The control means includes means for permitting the transmission to the primary counting means of a selected one only of at least two predetermined portions of the pulses produced by the temperature responsive means during the fixed period of time, the selected portions of pulses being proportional to the magnitudes of the sensed temperature as expressed in respective measurement scales. The thermometer also includes decoding and display means coupled to the primary counting means for converting the number of pulses counted by the primary counting means during the fixed period of time into a digital display of the sensed temperature in the selected scale. In a preferred embodiment, the fixed period of time and the operating frequency of the temperature responsive means relative to the sensed temperature are selected such that the total number of pulses produced during the fixed period of time is directly proportional to the temperature as expressed in the Fahrenheit scale, and the control permits the transmission of all pulses when the Fahrenheit scale is the selected scale. When the Celsius scale is the selected scale, the control means permits the transmission of a lesser portion of the pulses. In accordance with a further aspect of the invention, the total number of pulses produced during the fixed period of time is a multiple N of the temperature as expressed in the Fahrenheit scale, and the control means includes conversion means operative when the selected scale is the Celsius scale to prevent the transmission to the primary counting means of the first 32N pulses produced during the fixed period of time and thereafter for the remainder of the fixed period of time to permit the transmission of five-ninths of the pulses produced by the temperature responsive means. In this manner, the total number of pulses transmitted to the primary counting means when the Celsius scale is selected is the same multiple N of the temperature as expressed in the Celsius scale.

In accordance with still further aspects of the invention, the control means includes clock means, secondary counting and read-time signal generating means coupled to the clock means for receiving clock pulses therefrom, and gating means for controlling the transmission of pulses from the temperature responsive means to the primary counting means. Means are provided for simultaneously causing the secondary counting means to start counting clock pulses and to initiate generation of a read-time signal. Subsequently, means responsive to the counting of a predetermined number P of clock pulses by the secondary counting means cause termination of the read-time signal. The gating means permits the transmission of temperature-related pulses only when it is supplied with a predetermined combination of input signals including the read-time signal. In this manner, the fixed period of time is determined by the time required for the clock means to produce the predetermined number P of clock pulses. Calibration means are provided for calibrating the fixed period of time during which pulses produced by the temperature responsive means may be transmitted through the gating means to the primary counting means. The calibration means may comprise an adjustable resistor which can be adjusted to vary the output frequency of a 555 type timer. Alternatively, the calibration means may comprise means for selectively presetting the secondary counting means so as to calibrate the fixed time by varying the predetermined number P of clock pulses which establish the fixed time.

BRIEF DESCRIPTION OF THE DRAWINGS

While the novel features of the invention are set forth with particularity in the appended claims, the invention, both as to organization and content, will be better understood and appreciated, along with other objects and features thereof, from the following description taken in connection with the drawings, in which:

DESCRIPTION OF A PREFERRED EMBODIMENT

Figure 1:
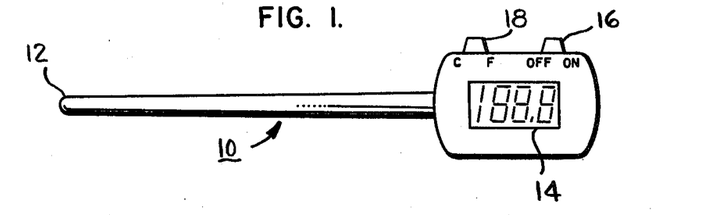
FIG. 1 is a view of a clinical thermometer incorporating the present invention.

Referring first to FIG. 1, an electronic clinical thermometer 10 incorporating the present invention is illustrated, the thermometer 10 including a temperature probe end 12 containing a thermistor 20 (FIG. 2) whose resistance changes as a function of its temperature. A digital display 14 of the seven segment type is provided upon which the sensed temperature is displayed in the appropriate one of the Fahrenheit and Celsius scale systems. A switch 16 has an "off" position for inactivating the thermometer 10 and an "on" position in which an appropriate source of power is connected to the operative parts of the thermometer. A switch 18 also has two operative positions, one specifying the Fahrenheit readout mode and the other specifying the Celsius readout mode. It will be obvious that the two switches 16 and 18 could be easily combined into a single switch having an "off" position and two "on" positions specifying the Fahrenheit and Celsius modes respectively. In order to conserve power, it may be desirable have the thermometer automaticaly turn itself off after a predetermined period of time.

Figure 2:
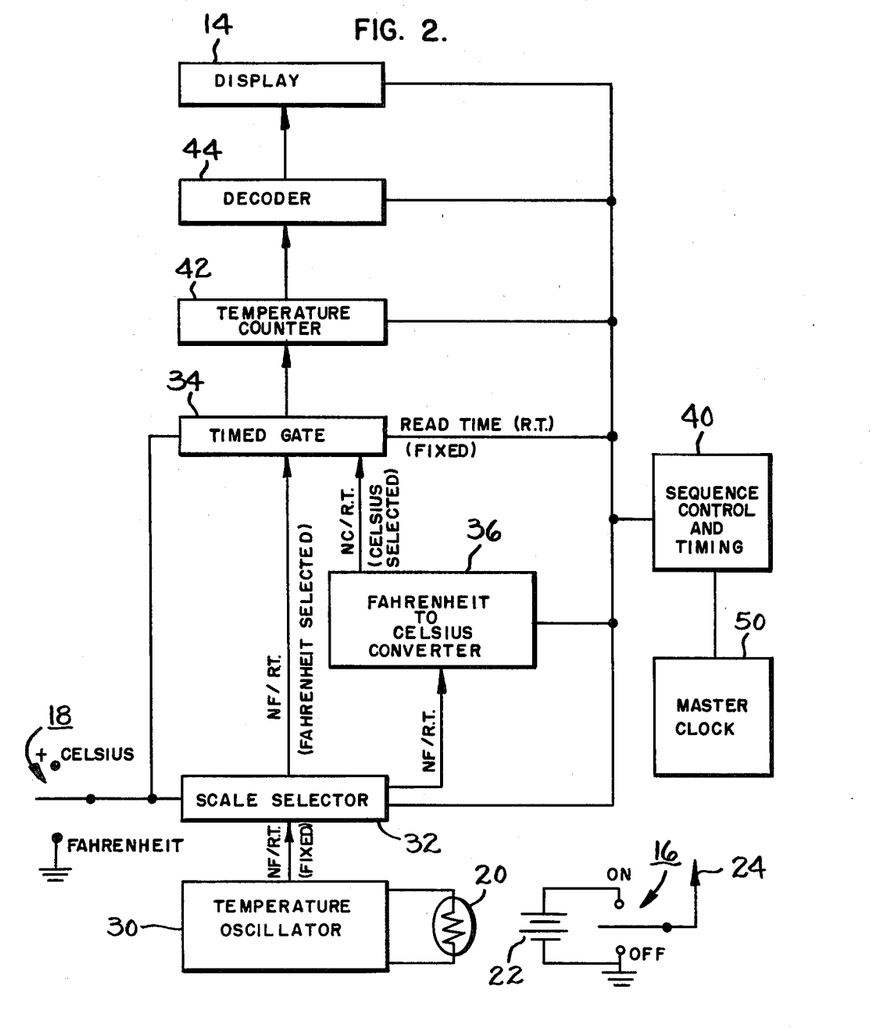
FIG. 2 is a block diagram showing the functional operation of the thermometer of FIG. 1.
Figure 3:
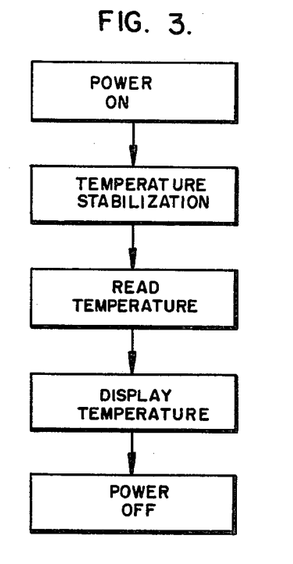
FIG. 3 is a flow diagram showing the function of the thermometer of FIG. 1 on a chronological basis.

FIGS. 2 and 3 provide simplified functional block and flow diagrams of the digital thermometer 10 of FIG. 1. As illustrated by FIGS. 1 through 3, the thermometer 10 includes the thermistor 20, the digital display 14, a suitable source of direct current power such as a 3-volt lithium battery 22, the on/off switch 16, and the Fahrenheit/Celsius selector switch 18. The thermometer 10 also includes components providing a number of functions as indicated by FIG. 2. When it is wished to sense a temperature, such as an oral temperature, the switch 16 is moved to its "on" position to supply operating voltage and current to all powered elements of the thermometer through the terminal 24. The end 12 of the thermometer and the enclosed thermistor 20 is then placed in a position in which the thermistor 20 can assume the temperature that it is wished to measure, or sense. The thermistor 20 is coupled to a temperature oscillator 30 which generates a train of pulses at a frequency related in a known manner as hereinafter described in more detail, to the sensed temperature. The pulses produced by the temperature oscillator 30 are directed to appropriate scale selecting circuitry, hereinafter referred to functionally as the scale selector 32, which selects Fahrenheit as the display temperature if the switch 18 is placed in its Fahrenheit position or Celsius as the display temperature if the switch 18 is in its Celsius position. If the selected display temperature is Fahrenheit, the temperature-responsive pulses are delivered directly to a temperature counter 42 through appropriate circuitry hereinafter functionally referred to as a timed gate 34. If the selected display temperature is Celsius, the output pulses from the temperature oscillator 30 are directed instead to appropriate circuitry hereinafter functionally referred to as a Fahrenheit to Celsius converter 36. In the converter 36, the output pulses from the temperature oscillator, which are generated at a frequency directly related to Fahrenheit temperature, are operated upon the appropriate logic circuitry to generate a train of output pulses at a frequency directly related to the Celsius expression of the sensed temperature. The train of output pulses from the converter 36 is supplied to the timed gate 34. Thus, depending upon the setting of the selector switch 18, the timed gate 34 has supplied to it a train of pulses representative of either the Fahrenheit temperature or the Celsius temperature.

It will, of course, be obvious that the temperature of the thermistor 20 may not stabilize for some time since its initial temperature may differ significantly from that of the medium whose temperature is to be determined. To avoid premature and misleading temperature readings, the timed gate 34 is not opened until the thermistor 20 has had an opportunity to stabilize at the proper temperature. In clinical thermometers such as the one illustrated by FIG. 1, a suitable stabilization period is approximately 60 seconds. The gate 34 opens only when it is supplied with a turn-on, or read-time (R.T.), signal by a sequence controller 40. The desired delay in the opening of the gate 34 can be provided by a delay of 60 seconds, or other appropriate period, in the delivery of the read time signal from the sequence controller 40. The read-time signal is produced by the sequence controller 40 for a fixed period of time only (the "read-time"). During the read-time, the temperature related pulses supplied to the gate 34 are passed to the temperature counter 42, which counts the received pulses. Upon the removal of the read-time signal, the sequence controller 40 instructs a decoder 44 to convert the count in the counter 42 into appropriate signals for activating the display 14 of the seven segment type, which digitally displays the actual temperature in the selected one of the Fahrenheit or Celsius scales. The temperature is thereafter displayed for a period of time established by the sequence controller 40, after which the display is turned off to conserve power. The thermometer may, of course, be turned off at any time by merely moving the switch 16 to its "off" position.

Figure 4:
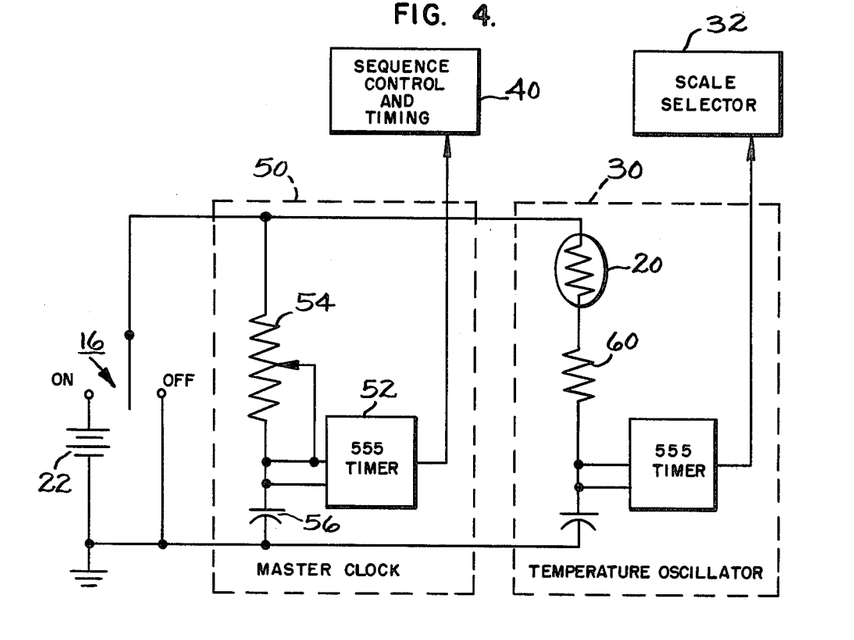
FIG. 4 is a block diagram of the temperature oscillator and the master clock of FIG. 2.

In FIGS. 2 and 4, a master clock 50 is illustrated. When the switch 16 is moved to its "on" position, electric power is supplied to the master clock 50, which includes a 555 type timer 52 coupled to an RC network including a resistor 54 and a capacitor 56. Sine timing devices of the type illustrated are very well known in the art, the internal construction of the 555 type timer 52 will not be described herein. Such timers may be purchased on the open market; the actual timer used in one embodiment of the invention is available from Motorola under the designation MC 1455/MC 1555. In operation, the resistor 54 and the capacitor 56 establish a time constant which establishes the frequency at which the timer 52 generates a series of timing pulses, which are delivered to the sequence controller 40. With the resistance and capacitance of the resistor 54 and the capacitor 56 fixed, the clock pulses are generated by the master clock 50 at a fixed frequency. As illustrated by FIG. 4, the resistor 54 is shown as a variable resistor, but any adjustment in the resistance is made only during the initial manufacture of the thermometer 10 as hereinafter described. Therafter, the master clock 50 generates clock pulses at a fixed frequency.

The temperature oscillator 30 as shown by FIG. 4 is essentially identical to the master clock 50, the difference being in the replacement of the fixed value resistor 54 by a series combination of the thermistor 20 and a fixed value resistor 60. Since a thermistor is characterized by a negative coefficient of resistance, the time constant of the temperature oscillator 30 will vary with the temperature sensed by the thermistor 20. More specifically, if the temperature is relatively low, the resistance of the thermistor will be relatively high, and the time constant at that temperature will be relatively high. As a result, the output pulses generated by the temperature oscillator 30 will be produced at a relatively low frequency. At a higher temperature, the resistance of the thermistor 20 will be proportionately less, and the clock pulses supplied to the scale selector 32 will be generated at a proportionately higher frequency. In practice, the components establishing the time constant of the temperature oscillator 30 are selected such that the percentage change in the output frequency tracks the percentage change in the temperature as expressed in the Fahrenheit scale. For example, if the output frequency from the temperature oscillator 30 at a sensed temperature of 100° F. is 14,355.7 Hz, it is desirable that the output frequency decrease to 14,213 Hz (one percent drop) in the event that the temperature drops by one degree Fahrenheit (one percent drop) to 99° F. Similarly, the output frequency should increase by one percent if the Fahrenheit temperature increases by one degree. The reason for this requirement will become obvious as this description proceeds.

The foregoing description assumes that the resistance of the thermistor 20 changes in a linear fashion with temperature. This assumption leads to satisfactory results when the thermometer 10 is intended for use over a relatively small temperature range, such as will be encountered when the thermometer is used as a clinical thermometer for measuring body temperature. If, however, it is desired to utilize the thermometer over a broad range of temperatures, it may be necessary to provide appropriate circuitry for compensating for the typical non-linearity of thermistors over broad temperature ranges and for assuring that identical percentage changes occur in the temperature as expressed in the Fahrenheit, or other utilized, scale system and in the output frequency of the temperature pulses.

Figure 5:
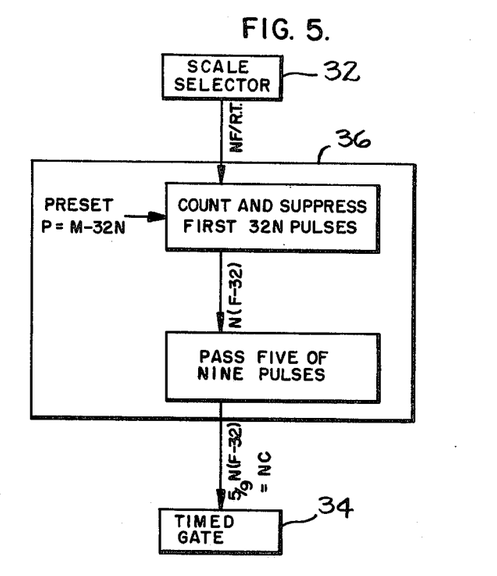
FIG. 5 is a diagram illustrating the functional operation of the Fahrenheit to Celsius converter of FIG. 2.

Referring now to FIGS. 2, 4 and 5, the basic mode of operation of the thermometer will be described. First, let it be assumed that the display 14 is a digital display that displays the sensed temperature in tenths of degrees in the selected scale. Thus, a temperature of 100° F. will be displayed as 100.0 when Fahrenheit is the selected scale and 37.7 when Celsius is the selected scale. To provide these display magnitudes, one thousand temperature pulses must be delivered to the temperature counter 42 during the period (read-time) that the gate 34 is open if the selected scale is the Fahrenheit scale or 377 temperature pulses (10×°C.) must be delivered to the counter 42 if the Celsius scale is the selected scale.

If, as noted above, pulses are generated by the temperature oscillator 30 at a frequency of 14,355.7 Hz when the sensed temperature is 100° F., the time required for the oscillator 30 to produce the required 1,000 pulses will be 69.655 milliseconds. If the selector switch 18 is set in its Fahrenheit position such that the scale selector 32 permits all temperature pulses to pass directly to the timed gate 34, exactly 1,000 pulses will be passed to the counter 42 if the read-time (R.T.) signal produced by the sequence controller has a duration of 69.65 milliseconds. If, however, the switch 18 is set in its Celsius position, the 1,000 temperature pulses produced during the gate interval will be directed to the converter 36 where, as best shown by FIG. 5, the first 32N (N=10 in this example) or 320 pulses are suppressed and five out of each nine subsequent pulses are passed to the timed gate 34. In the given example of a temperature of 100° F., the first 320 pulses produced during the read-time (R.T.) period will be suppressed, and five-ninths of the remaining 680 pulses, or 377 pulses, will be delivered to the gate 34 during the read-time period. Thereafter, upon closing of the gate 34, the decoder 44 and the display 14 will, upon receipt of appropriate instructions from the sequence controller 40, cause the accumulated count in the counter 42 to appear as either 100.0 or 37.7. As a result, the sensed temperature is displayed in the selected scale system to the nearest one-tenth of a degree.

As indicated above, if it is desired to display temperature in tenths of degrees, 10 pulses must be transmitted to the counter 42 for each degree in the selected scale. If it is desired to display temperature in one-hundredths of degrees, 100 pulses must be transmitted for each degree in the selected scale. The multiplier may be expressed as a number with the understanding that, for 100° F., NF means 1,000 if N=10 and 10,000 if N=100. Similarly, 32N means that the first 320 pulses are suppressed if N=10.

To this point, it has been assumed that the sequence controller 40 produces the read-time signal for a period of 69.65 milliseconds. If the master clock 50 produces clock pulses at a fixed frequency of 20,000 Hz, the period of each clock pulse will be 0.05 milliseconds, and the clock 50 will produce 1,393 pulses in 69.655 milliseconds. The sequence controller 40 includes counting means which can count the clock pulses. A read-time signal will be generated for the 69.655 millisecond period if the sequence control-ler 40 simultaneously initiates the read-time signal and starts to count clock pulses and thereafter terminates the read-time signal upon the counting of 1,393 pulses.

It has been assumed that the master clock 50 operates at a frequency of 20 KHz and that the temperature oscillator 30 operates at a frequency of 14,355.7 Hz when the actual temperature is 100° F. In practice, it may be found upon manufacture of the thermometer that one or both of the clocks 30 and 50 operate at a frequency which varies from the ideal described herein. At a later point in this description, appropriate calibration means will be described for varying the frequency of the master clock so as to assure that the displayed temperature accurately tracks the actual temperature.

Figure 6:
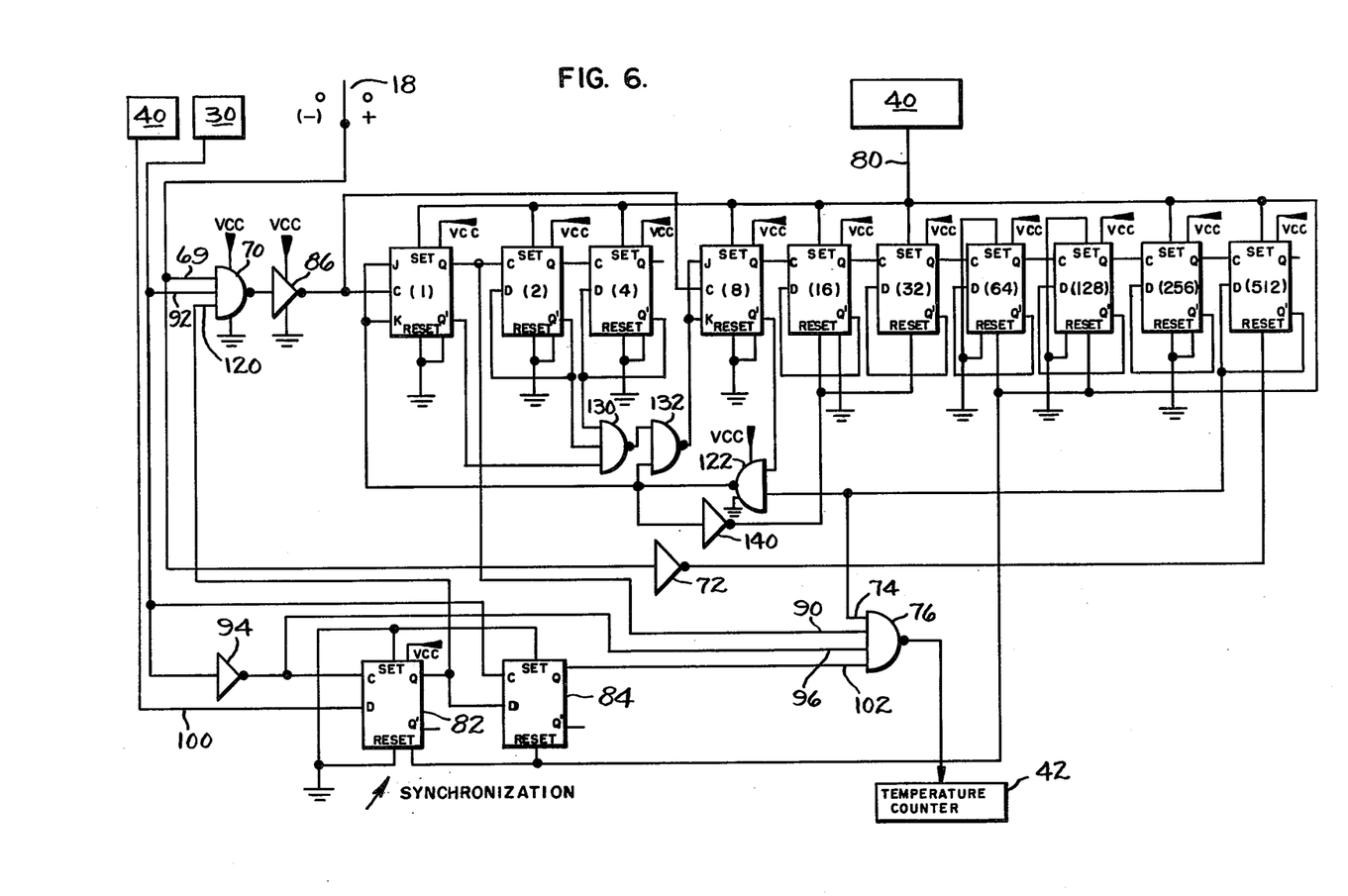
FIG. 6 is a detailed circuit diagram of the Fahrenheit to Celsius converter.

The detailed construction and operation of apparatus providing the functions of FIG. 2 will now be described with respect to FIGS. 2, 5, 6, 7 and 8. For descriptive purposes, it will initially be assumed that the switch 18 is placed in its Fahrenheit position. As illustrated by FIG. 6, a LOW voltage, or logic "0", signal will therefore be supplied from the switch 18 to one input 69 of a NAND gate 70 and to an inverter 72. The resulting HIGH voltage, or logic "1", output from the inverter 72 is supplied to the RESET input of a delay flip-flop (512), causing the Q' output of the flip-flop (512) to go HIGH and thereby supply a "1" input signal to a first input 74 of a NAND gate 76. Prior to the delivery of a read-time (R.T.) signal from the sequence controller 40, the sequence controller supplies a brief RESET signal of logic level "1" over line 80 to the SET inputs of flip-flops (1), (2), (4), (8), (16), (32), (256) and (512), causing the Q output of each to go HIGH and the Q' output of each to go LOW. The RESET signal on line 80 is also supplied to the RESET inputs of flip-flops (64), (128), 82 and 84, causing the Q' output of each to go HIGH. Upon removal of the signal on line 80, the flip-flops remain in the states specified by the RESET signal, with the exception of flip-flop (512) which continues to supply a "1" signal to the input 74 of the NAND gate 76 because of the continuing presence of the LOW voltage signal from switch 18. Thus, so long as the switch 18 is set in its Fahrenheit position, a "1" signal will be supplied to the input 74 of gate 76.

The signal to the input 69 of the gate 70 will remain LOW so long as the switch 18 is set in its Fahrenheit position. As a result, the output of the gate 70 will remain at a logic "1" level, and the output of the gate 70 will therefore be continuously inverted by an inverter 86 to a logic "0". The output of the inverter 86 is connected to the clock input of the first flip-flop (1) of a counting chain comprising the flip-flops (1), (2), (4), (8), (16), (32), (64), (128), (256), and (512). Since the output of the inverter 86 remains "0" so long as the switch is set in its Fahrenheit position, the counting chain of flip-flops remains inoperative because of the absence of clock pulses, and the Q output of the (1) flip-flop therefore stays continuously at the "1" level. As a result, a continuous "1" signal is supplied to a second input 90 of the NAND gate 76.

Figure 7:
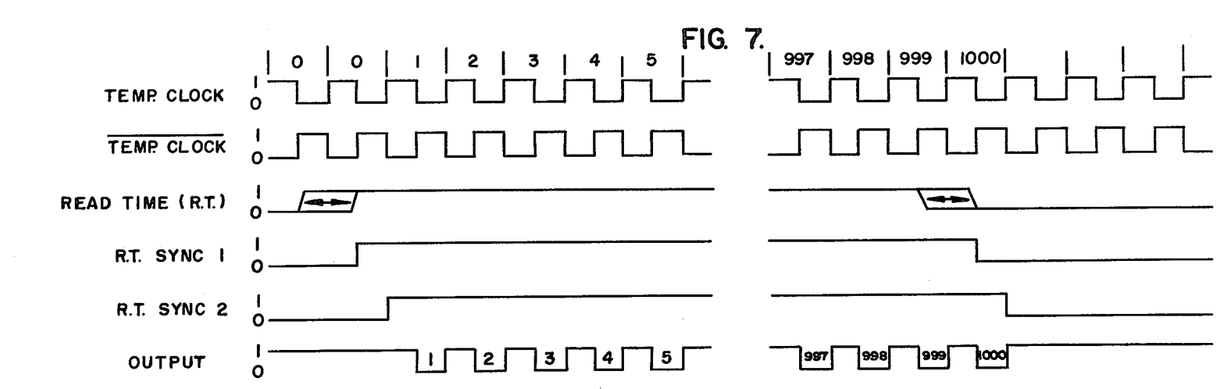
FIG. 7 is a timing diagram of the circuit of FIG. 6 when the sensed temperature is displayed in the Fahrenheit scale system.

The pulses from the temperature oscillator 30 are continuously supplied to a second input 92 of the gate 70, the clock input of the delay flip-flop 84, and an inverter 94. The chain of temperature pulses supplied by the temperature oscillator 30 is illustrated by FIG. 7 by the line labeled "TEMP CLOCK". The temperature pulses may be considered to be a series of "0" level pulses from a "1" level basic. The inverter 94 inverts the temperature pulses to produce a chain of pulses labeled "TEMP CLOCK'" in FIG. 7, the TEMP CLOCK' signal being delivered to the clock input of the flip-flop 82. In addition, the TEMP CLOCK' signal is also supplied to a third input 96 of the gate 76. The data input of the delay flip-flop 82 is connected to the sequence controller 40 by line 100, which is the line over which a logic "1" read-time signal may be delivered from the sequence controller 40. As illustrated by FIGS. 6 and 7, prior to initial delivery of the read-time signal, the data input of flip-flop 82 is "0", and as a result its Q output (labeled "R.T. Sync 1" in FIG. 7) remains "0". Since the R.T. Sync 1 is "0" and is supplied to the data input of delay flip-flop 84, the Q output (labeled "R.T. Sync 2") of flip-flop 84 will also be "0". This output is supplied to the fourth input 102 of the gate 76. So long as the R.T. Sync 2 signal remains "0", the output of gate 76 (labeled "Output") to the temperature counter 42 will remain "1" no matter what happens at the other inputs to the gate 76.

Prior to or simultaneously with the delivery of a read-time signal to the data input of the flip-flop 82, the temperature counter 42 is cleared by an appropriate signal from the sequence controller 40 so that it will have a zero count condition. When a read-time signal is initially supplied over line 100 at any time during the interval labeled 110 in FIG. 7, the R.T. Sync 1 signal from the Q output of the flip-flop 82 will become "1" on the next positive-going edge of the TEMP CLOCK' signal. The R.T. Sync 2 signal from the Q output of the flip-flop 84 will then become "1" on the next positive-going edge of the TEMP CLOCK signal, and the R.T. Sync 1 and R.T. Sync 2 signals will remain "1" so long as a read-time signal of logic level "1" is supplied from the sequence controller 40. Since the inputs 74, 90 and 102 of the gate 76 are thus continuously supplied with logic "1" signals throughout the duration of a read-time signal, the gate 76 will produce a logic "0" output whenever the TEMP CLOCK' signal to its input 96 is "1" and a logic "1" output whenever the TEMP CLOCK' signal is "0". It will thus be seen that the gate 76 passes the "0" level temperature pulses of the TEMP CLOCK signal to the temperature counter throughout the duration of the read-time signal. When the read-time signal is removed during the interval 112 (after 69.65 milliseconds in the example given), the R.T. Sync 1 signal will become "0" on the next positive going edge of the TEMP CLOCK' signal, and the R.T. Sync 2 signal will become "0" on the next positive-going edge of the TEMP CLOCK signal. If during the existence of the read-time signal, there are 1,000 pulses of "0" level generated by the temperature oscillator 30, 1,000 pulses will be supplied to the temperature counter 42 through the gate 76. Upon subsequent instructions from the sequence controller 40, the 1,000 counts stored in the temperature counter 42 will be decoded and displayed as the number 100.0, thus indicated a temperature of 100° F. in the Fahrenheit scale. If, on the other hand, 990 pulses are supplied to and stored in the counter 42 during the read-time period, the displayed temperature will be 99.0° F.

It will be noted from FIG. 7 that the duration of the R.T. Sync 2 signal is the same as the duration of the read-time signal. The function of the synchronization flip-flops 82 and 84 is to synchronize the actual read-time as specified by the R.T. Sync 2 signal with the TEMP CLOCK signal so as to assure that no temperature pulses will be lost. This can be assured through the synchronization in combination with a requirement that the master clock frequency be greater than that of the temperature oscillator.

Figure 8:
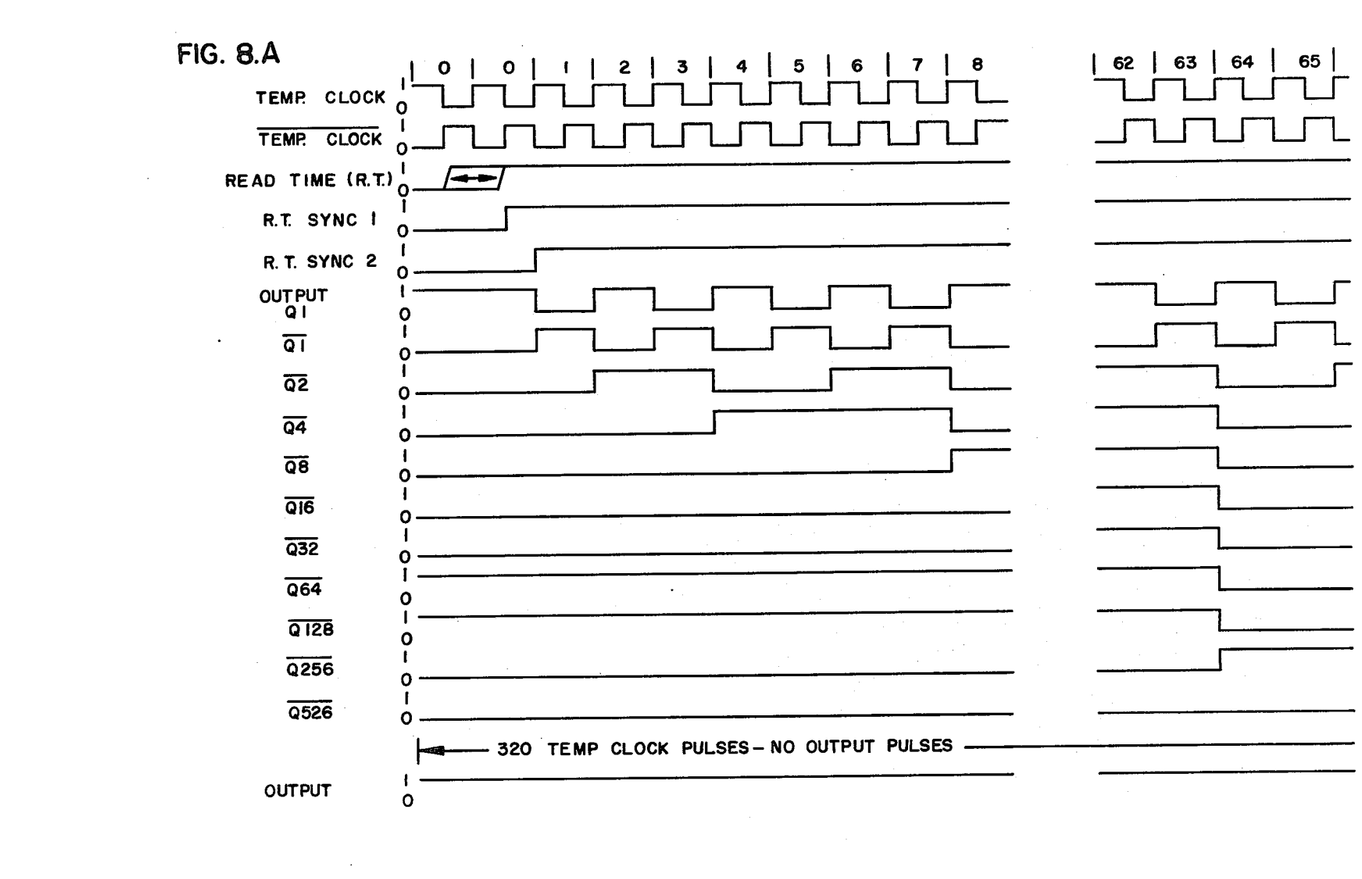
FIGS. 8A-8C are timing diagrams of the circuit of FIG. 6 when the sensed temperature is displayed in the Celsius scale system.

Referring now to FIG. 6 and the timing diagram of FIG. 8, operation in the Celsius mode will be described. As in the Fahrenheit case, a RESET signal is initially supplied over line 80 to set the Q' outputs of flip-flops (1), (2), (4), (8), (16), (32), (256), and (512) to "0" and to set the Q' outputs of flip-flops (64), (128), 82 and 84 to "1". When the switch 18 is set in its Celsius position, a HIGH or logic "1" signal is supplied to the input 69 of the gate 70 and to the inverter 72, from which a "0" is supplied to the RESET terminal of the flip-flop (512). As a result, unlike the situation in the Fahrenheit case, the Q' output of flip-flop (512) remains "0", and the resulting "0" input to gate 76 assures that the output from gate 76 to the temperature counter 42 will remain "1" so long as the output Q' of flip-flop (512) remains "0".

When a read-time signal is supplied over line 100 from the sequence controller 40 to the data input of the delay flip-flop 82, the flip-flops 82 and 84 react in the same manner as they did in the Fahrenheit case discussed above. More particularly, a continuous R.T. Sync 2 signal of logic "1" is supplied to input 102 of gate 76 and the TEMP CLOCK' signal is supplied to input 96. Following the delivery of the R.T. Sync 2 and TEMP CLOCK' signals, the output of the gate 76 initially remains "1", however, because of the presence of the "0" signal at input 74.

The R.T. Sync 1 continuous "1" signal is delivered to the input 120 of the gate 70 along with the "1" signal at input 69. As a result, the TEMP CLOCK' signal is applied to the inverter 86, and the TEMP CLOCK signal is applied to the clock input of the toggle flip-flop (1). On the first positive-going edge of the TEMP CLOCK signal following the application of the R.T. Sync 1 signal, flip-flop (1) will toggle in response to the "1" signal applied to both of its J and K inputs from gate 122 as a result of the Q' outputs of flipflops (8) and (512) being initially "0". On each subsequent positive-going edge of the TEMP CLOCK signal, flip-flop (1) will toggle, and the count will propogate through the chain of flip-flops (1) through (256) in a manner which will be obvious to those skilled in the art. The chain of flip-flops (1) through (256) has a maximum count capability of 511 counts if all of the Q' outputs are initially set at "0". In such a case, the (512) flip-flop will change its state on the 512th pulse, its output Q' going HIGH, to a logic "1" level. Because, however, of the delivery of the initial RESET signal on line 80 to the RESET terminals of flip-flops (64) and (128), these flip-flops are preset to counts of 64 and 128, respectively, or a total precount of 192. As a result, flip-flop (512) will change its state not on the 512th pulse, but on the 320th pulse (512−192=320).

Although persons skilled in the art will readily follow the counting of the chain of flip-flops (1) through (512), it will be appropriate to make a few comments about the operation of flip-flop (8). Flip-flop (8) is, as flip-flop (1), supplied with the TEMP CLOCK signal at its clock input. The flip-flop (8) does not toggle, however, during the first seven cycles of the TEMP CLOCK signal since at least one input to the NAND gate 130 is "0" during the first six cycles.

As a result, both inputs to the NAND gate 132 are "1" during the first six cycles, the result being an input of "0" to the J and K inputs of the flip-flop (8) throughout the first seven cycles of the TEMP CLOCK signal. During the seventh cycle of the TEMP CLOCK signal, however, all inputs to gate 130 are "1", its output to gate 132 therefore becoming "0". As a result, the inputs J and K of flip-flop (8) become "1" during the seventh cycle, and the flip-flop (8) therefore changes state during the eighth cycle of the TEMP CLOCK signal.

During the first 320 cycles, or pulses, of the TEMP CLOCK signal, the input 74 of the gate 76 remains at the logic "0" level, thereby assuring that the output of the gate 76 remains continuously at the "1" level. As a result, the first 320 pulses of the TEMP CLOCK signal are suppressed and not transmitted through the gate 76 to the temperature counter 42. On the 320th pulse, however, the input 74 goes to logic "1" along with the output Q from the flip-flop (1) to the input 90. Since inputs 74, 90 and 102 are all "1" during the 320th cycle, an output signal "0" is supplied to the temperature counter 42 during the period that the TEMP CLOCK' signal goes to the logic "1" level and the TEMP CLOCK signal goes to the logic "0" level. In other words, the "0" pulse of the TEMP CLOCK signal during the 320th period is transmitted to the temperature counter 42. This first pulse transmitted to the counter 42 is labeled with the numeral one on the timing diagram of FIG. 8 for the output signal. During the next TEMP CLOCK cycle, the output Q of the flip-flop (1) is "0", and as a result the output of gate 76 remains at the "1" level throughout the cycle; the TEMP CLOCK pulse during this cycle (labeled 1) is thus suppressed. In a similar manner, the TEMP CLOCK pulses during the cycles labeled 2, 4, 6 and 8 are transmitted to the temperature counter 42 as "0" pulses while the temp clock pulses during cycles 3, 5 and 7 are suppressed. Thus, following the first 320 suppressed pulses, five of the next nine pulses are transmitted.

During the TEMP CLOCK signal cycle labeled 7, the Q' outputs of the flip-flops (1), (2) and (4) are all "1". As a result, the J and K inputs of the toggle flip-flop (8) are made both "1", and the flip-flop (8) toggles on the next positive going edge of the TEMP CLOCK signal. At this point, the Q' outputs of both of the flip-flops (8) and (512) are "1", causing a "0" to be applied to the input J and K of flip-flop (1) and, acting through gate 132, a "1" to be applied to the inputs J and K of flip-flop (8). As a result, flip-flop (1) does not toggle on the next TEMP CLOCK pulse (labeled 0), but flip-flop (8) does toggle. In addition, the "0" output from gate 122 during the cycle labeled 8 acts through inverter 140 to provide a "1" signal at the RESET terminals of flip-flops (16) and (32) to prevent propogation of the counting through the remaining flip-flops. Since flip-flop (8) toggles during the cycle labeled 0, its Q' output becomes "0" and thus causes a "1" to appear at the inputs of flip-flop (1). As indicated by the timing diagrams of FIG. 8, the output to the temperature counter 42 during the cycles labeled 0 through 8 follow the same pattern as that during the cycles labeled 320 through 8 discussed above. The gate 76 will thus continue to pass five out of each nine pulses so long as the read-time signal is supplied by the sequence controller 40. When the read-time signal is removed, pulses will stop being passed by the gate 76 in the manner discussed above with respect to the Fahrenheit case.

Heretofore, it has been assumed that the read-time signal is provided for a fixed period of 69.6555 milliseconds and that exactly 1,000 TEMP CLOCK pulses will be produced by the temperature oscillator 30 during the read-time period for a temperature of 100° F., or a proportional number of pulses for other Fahrenheit temperatures. If the Fahrenheit scale is selected for display, it has been shown that all pulses produced during the read-time period will be counted by the temperature counter 42 and that the accumulated pulses will be displayed as the temperature by the display 46 (100.00 for 100° F. as described above). Also, as pointed out above, if the Celsius scale is selected the first 320 pulses will be suppressed, and five out of every nine of the remaining pulses will be transmitted through the gate 76 to the temperature counter 42. If the temperature is 100° F. (37.7° C.), 377 pulses will be counted and displayed as 37.7.

In practice, however, it may be found that the frequency of one or both of the clocks, the master clock 50 and the temperature oscillator 30, differs from the heretofore assumed 20,000 Hz frequency for the master clock 50 and the 14,355.7 Hz frequency for the temperature oscillator 30 at a temperature of 100° F. If either frequency varies, the number of temperature pulses produced during a read-time established by 1,393 pulses of the master clock will be different from 1,000 for a temperature of 100° F., and the display 46 will therefore provide an incorrect reading. It is therefore desirable that means be provided for calibrating the thermometer.

Appropriate calibration means will now be described with reference to FIGS. 2, 4, 9 and 10. With reference first to FIGS. 2 and 4, let it be assumed that, upon completion of initial manufacture, it is found upon testing that the frequency of the master clock 550 is the desired 20,000 Hz, but the actual frequency of the temperature oscillator 30 when the thermistor 20 is at 100° F. is 12,000 Hz rather than 14,357 Hz. In such event, the time required for the production of 1,000 temperature pulses would be 83.33 milliseconds not 69.65 milliseconds. Since, in this case the sequence controller 40 includes counting means for synchronizing the read-time signal with 1,393 master clock pulses, calibration can be provided by changing the period of each clock pulse from 0.05 millisecond (1,393×0.05 milliseconds=69.65 milliseconds) to 0.05982 milliseconds (1,393×0.05982=83.33 milliseconds). This can be easily accomplished during the manufacturing phase by merely adjusting the resistance of the resistor 54 of the master clock 50 until the known sensed temperature of 100° F. appears as 100.0 on the display 46. The calibration of the resistor 54 may thus require some trial and error adjusting until the proper reading is obtained.

Figure 9:
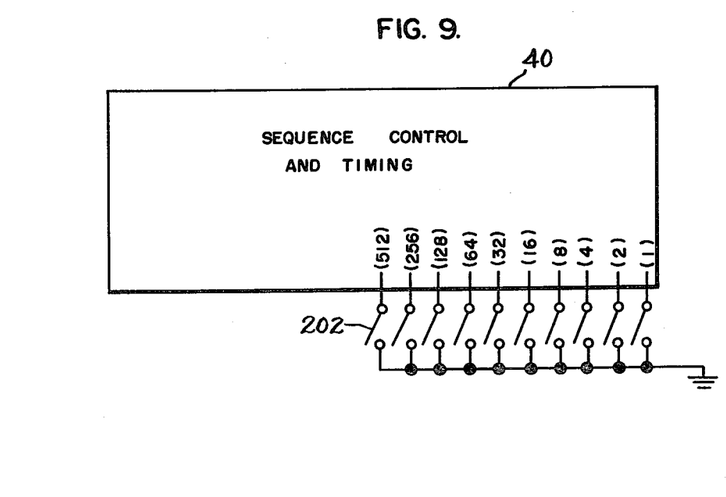
FIG. 9 is a diagram showing the switches or fuse links associated with the master clock pulse counting means of the sequence controller.
Figure 10:
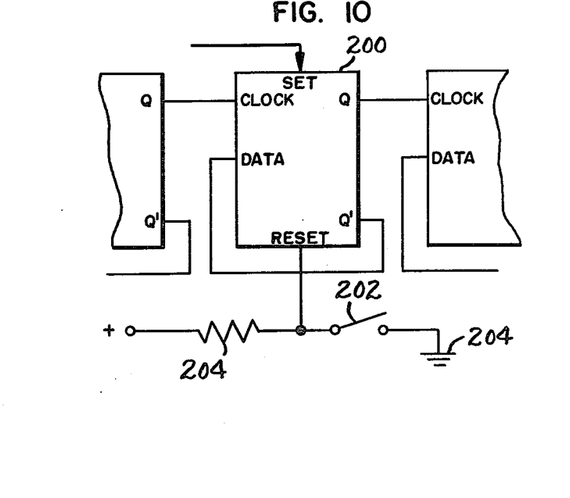
FIG. 10 is a view of a typical flip-flop used in the master clock pulse counter.

An alternative calibration arrangement is illustrated by FIGS. 9 and 10 along with FIGS. 2 and 4. In this embodiment, the sequence controller 40 is provided with a presettable counter of a type well-known in the art. Such a counter preferably includes a train of flip-flops of the type illustrated by FIG. 6, a typical flip-flop 200 of the train along with its connections to the adjacent flip-flops of the train being illustrated by FIG. 10. The counter has a maximum count condition substantially greater than 1,393, say a maximum count condition of 2,048 such as would be provided by a train of twelve flip-flops. Each of the first ten flip-flops (1), (2), (4), (8), (16), (32), (64), (128), (256) and (512) is provided with an individual switch 202 which may be closed to connect the RESET terminal of the flip-flop to ground 204, a logic "0". Alternatively, the switch 202 may be opened to connect the RESET terminal through a resistor 204 to the HIGH voltage supply, a logic "1" signal. If a switch 202 is closed, the associated flip-flop is not preset; if, however, the switch is open, the flip-flop is preset to the logic value of the flip-flop. In actual practice, the switches 202 would be fuse links which would normally be closed, but could be fused to open the circuit and thus preset the respective flip-flops.

If, upon manufacture, it is found that the master clock is operating at 20,000 Hz and that the temperature oscillator 30 at 100° F. is operating at a frequency of 14,355.7 Hz, the proper read-time is provided by 1,393 master clock pulses as discussed above. To set the 12th flip-flop after 1,393 pulses, the counter must be preset to a count of 655 (2,048−1,393=655). This can be accomplished by opening switches associated with flip-flops (1), (2), (4), (8), (128) and (512) since the sume of their respective logic values equals the desired preset value (1+2+4+8+128+512=655).

If, however, it is found that the temperature oscillator at 100° F. is generating pulses at a frequency of 12,000 Hz while the master clock continues to generate pulses at a frequency of 20,000 Hz, it will take 83.33 milliseconds for the temperature oscillator 30 to generate the required 1,000 pulses. Since the period of each master clock cycle is 0.05 milliseconds, it will take 1,667 clock pulses to provide a read-time of 83.33 milliseconds. This can be accomplished by presetting the counter to a preset count of 381. The preset of 381 can be provided by opening the switches 202 of flip-flops (1), (4), (8), (16), (32), (64) and (256) (1+4+8+16+32+64+256=381). Alternatively, it may be found that the temperature oscillator is operating at the desired frequency 14,355.7 Hz while the master clock frequency has strayed from the desired level to, say, 19,000 Hz. In such a case, the correct read-time is 69.65 milliseconds. Since the new period of the master clock pulses is 0.05263 millisecond, it will be obvious that the desired read-time will be provided by 1,324 master clock pulses. In such a case, the switches 202, or appropriate fuse links, should be set for a precount of 724 in the manner described above. Furthermore, it should be appreciated that both frequencies may stray from the design frequencies; in such a case, the proper readings may be obtained by adjusting only the period of the clock pulses in the manner described.

The calibration method described in connection with FIGS. 9 and 10 has certain advantages over that illustrated by FIG. 4. The primary advantage is that automated equipment can provide the calibration without any trial and error adjustments. Automated equipment can be utilized to measure the output frequencies of the temperature oscillator 30 and the master clock 50, make the necessary calculations to determine the number of required master clock pulses, and open the proper switches 202 or fuse links. In addition, logic circuitry and fuse links of the type described often can be provided at lower cost than adjustable resistors, particularly where the devices are made in large quantities in integrated circuit form.

From the foregoing, it will be seen that the present invention provides an improved electronic thermometer that is capable of providing a digital indication of a sensed temperature in a selected one of at least two measurement scales, preferably the Fahrenheit and Celsius scales. The thermometer can be accurately calibrated without excessive material or labor costs.

While the invention has been particularly shown and described with reference to a preferred embodiment thereof, it will be understood by those skilled in the art that various changes in form, details, and application may be made therein without departing from the spirit and scope of the invention. Accordingly, it is intended that all such modifications and changes be included within the scope of the appended claims.

What is claimed as new and is desired to secure by Letters Patent of the United States is:

1. An electronic digital thermometer comprising:
   temperature responsive means for producing pulses at a frequency related in a known manner to the sensed temperature,
   primary counting means, control means coupled to temperature responsive means and said primary counting means for permitting the transmission of pulses produced by said temperature responsive means to said primary counting means for a fixed period of time only, said control means comprising means for permitting the transmission to said primary counting means of a selected one only of at least two predetermined portions of the pulses produced by said temperature responsive means during said fixed period of time, said selected portions of pulses being proportional to the magnitudes of the sensed temperature as expressed in the Fahrenheit and Celsius measurement scales,
   the fixed period of time established by said control means and the operating frequency of said temperature responsive means relative to sensed temperature being selected such that the total number of pulses produced during said fixed period of time is a multiple N of the temperature as expressed in the Fahrenheit scale, said control means permitting the transmission of all of said pulses when the Fahrenheit scale is the selected scale and said control means further comprising conversion means operative when the selected scale is the Celsius scale to prevent the transmission to said primary counting means of the first 32 N pulses produced by said temperature responsive means during said fixed period of time and thereafter for the remainder of said fixed period of time to permit the transmission to said primary counting means of only five-ninths of the pulses produced by said temperature responsive means, whereby the total number of pulses transmitted to said primary counting means when the selected scale is the Celsius scale is the same multiple N of the temperature as expressed in the Celsius scale,
   and decoding and display means coupled to said primary counting means for converting the number of pulses counted by said primary counting means during said fixed period of time into a digital display of the sensed temperature in the selected scale.

2. An electronic digital thermometer as defined by claim 1 further comprising clock means for producing clock pulses at a fixed frequency, and in which said control means includes:
   secondary counting and read-time signal generating means coupled to said clock means for receiving clock pulses therefrom,
   gating means coupled to said primary counting means, said gating means having a first operative condition permitting the transmission of pulses produced by said temperature responsive means to said primary counting means and a second operative condition preventing the transmission of pulses produced by said temperature responsive means to said primary counting means, said gating means assuming and maintaining said first operative condition only in the presence of a predetermined combination of input signals including a read-time signal,
   means for simultaneously causing said secondary counting means to start counting clock pulses and to initiate generation of a read-time signal,
   and means responsive to the counting of a predetermined number P of clock pulses by said secondary counting means for terminating generation of said read-time signal,
   said fixed period of time being determined by the time required for said clock means to produce said predetermined number P of clock pulses and the duration of said read-time signal.

3. An electronic digital thermometer as defined by claim 2 further comprising means for calibrating said fixed period of time during which pulses produced by said temperature responsive means may be transmitted through said gating means to said primary counting means, said calibrating means comprising means for selectively calibrating the fixed frequency of the clock pulses produced by said clock means.

4. An electronic digital thermometer as defined by claim 3 in which said clock means is a 555 type timer and said calibrating means is an adjustable resistor whose resistance may be selectively varied to change the charging time of a timing capacitor in an RC circuit coupled to the 555 type timer.

5. An electronic digital thermometer as defined by claim 2 in which said secondary counting means is a presettable counter having a maximum count condition M which is greater than any anticipated predetermined number P of clock pulses, said means for terminating generation of said read-time signal operating in response to said secondary counting means reaching its maximum count condition M, said control means further comprising calibrating means for presetting said secondary counting means to an initial count S equal to M−P such that said secondary counting means reaches its maximum count condition M when said predetermined number P of clock pulses has been counted, whereby said fixed period of time and said predetermined number P of clock pulses may be calibrated by presetting the initial count S of said secondary counting means.

* * * * *